March 19, 1968 J. V. COWAN 3,374,367
ELECTROACOUSTIC TRANSDUCERS
Filed Jan. 21, 1966

INVENTOR
JOHN V. COWAN
BY
MATTERN, WARE & DAVIS
ATTORNEYS

United States Patent Office 3,374,367
Patented Mar. 19, 1968

3,374,367
ELECTROACOUSTIC TRANSDUCERS
John V. Cowan, 210 S. King St.,
Danbury, Conn. 06810
Filed Jan. 21, 1966, Ser. No. 522,065
7 Claims. (Cl. 310—8.5)

This invention relates to electroacoustic transducers. More particularly, it relates to self-damping electroacoustic transducers for use in echo sounding search units.

According to the invention, upon the application of a signal to the search unit, portions of the transducer expand and other portions contract. The expanding and contracting portions are arranged to store equal amounts of potential energy upon the application of a given signal. Thus, when the signal is terminated, the tension and compression strains within the transducer tend to cancel one another and the residual oscillations in the transducer are rapidly damped out.

Electroacoustic echo sounding techniques have found wide application in industry and science. Echo sounding is utilized to find objects in the ocean, to map the bottom of the sea, to search for underground formations, to measure the thickness of materials and to find defects in materials. In all of these applications, a pulse of electroacoustic energy is generated by a search unit to be transmitted into the medium being searched. The object being searched for reflects some of this acoustic energy back to the search unit or to an adjacent listening unit. The length of time it takes the sound to travel from the search unit to the object and back is a measure of the distance between the search unit and the object.

In nearly all applications the acoustic signal transmitted by the search unit is a plurality of wavelengths of a high frequency signal. That is, the electroacoustic transducer in the search unit is caused to rapidly oscillate for a very short period of time. Unfortunately, most electroacoustic transducers will "ring"; they continue to oscillate at their natural frequency of vibration after the termination of the exciting signal that caused them to oscillate. As long as the search unit is ringing, it is incapable of listening for the return echo from the object being sought. The ringing may similarly make it impossible for any nearby listening device to pick up the echo. Thus, objects close to the search unit are difficult to locate.

For this reason, most search units incorporate various elements for the purpose of damping out the vibrations in the transducers after the signal has terminated. Unfortunately, this damping affects the transducer during the time the signal is applied so that a well-damped transducer will produce very little power output. For this reason, it cannot be used to locate distant objects in the medium being searched. As a result, ringing in transducers of the prior art has made it very difficult to locate objects near the search units, has required multiple search units for near and far objects, and limited the overall range of use of a given search unit.

It is, therefore, an object of the present invention to provide improved search units for echo sounding.

Another object of the invention is to provide such search units for locating objects near the unit.

A further object of the invention is to provide such search units capable of locating objects a wider range of distances from the search unit than hithertofore possible.

Still another object of the invention is to provide a self-damping electroacoustic transducer.

Another object of the invention is to provide such a transducer for echo sounding search units.

A further object of the invention is to provide such transducers that are simple and adapted for use in prior art search units.

Other objects of the invention will in part be obvious and will in part appear hereinafter.

The invention accordingly comprises an article of manufacture possessing the features, properties, and the relation of elements which will be exemplified in the articles hereinafter described, and the scope of the invention will be indicated in the claims.

For a fuller understanding of the nature and objects of the invention, reference should be had to the following detailed description taken in connection with the accompanying drawing, in which.

Figure 9:
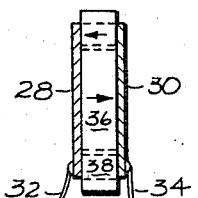
FIGURE 9 is a cross-sectional view taken along the line 9—9 of FIGURE 8.
Figure 11:
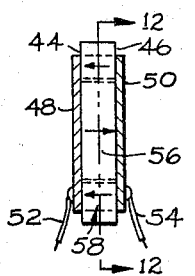
FIGURE 11 is a cross-sectional view taken along the line 11—11 of FIGURE 10.
Figure 12:
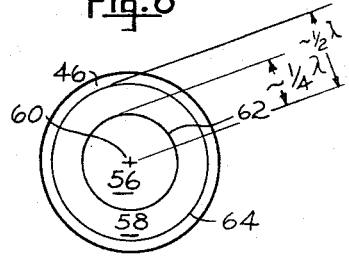

FIGURE 12 is a cross-sectional view taken along the line 12—12 of FIGURE 11; and FIGURES 13, 14, 15, and 16 are cross-sectional views similar to FIGURES 9 and 12 showing the vibration of an electroacoustic transducer according to the invention.

Figure 7:
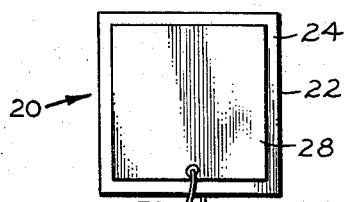
FIGURE 7 is a top view of an electroacoustic transducer according to the present invention.
Figure 8:
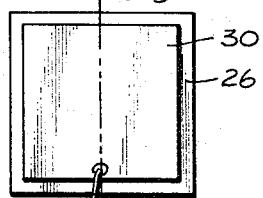
FIGURE 8 is a bottom view thereof.

Referring to FIGURES 7, 8 and 9, a transducer 20, according to the present invention, generally comprises a piezoelectric body 22 having parallel faces 24 and 26 to which a pair of flat electrodes 28 and 30 are affixed by conventional means. Leads 32 and 34 are connected to electrodes 28 and 30 by conventional means; for example, they may be soldered as shown. The piezoelectric body comprises two concentric portions 36 and 38 polarized in opposite directions as shown by the arrows. When an electrical potential is applied by means of leads 32 and 34 to the electrodes 28 and 30, one of the portions 36 and 38 will contract and the other expand. When the potential is reversed, the expanding and contracting portions will be reversed.

Figure 13:
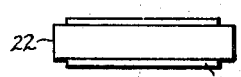
Figure 14:
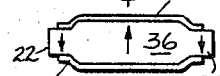
Figure 15:
Figure 16:
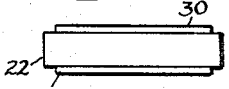

Thus referring to FIGURES 13, 14, 15 and 16, when no potential is applied, the transducer is as shown in FIGURE 13. When, for example, the potential is applied as in FIGURE 14, the central portion 36 expands and the concentric edge portion 38 contracts. When the potential is reversed as in FIGURE 15, the central portion 36 contracts and the edge portion 38 expands. When the potential between the electrodes 28 and 30 is again zero as in FIGURE 16, the piezoelectric body 22 returns to its original shape.

In the usual transducer assembly, a sinusoidal oscillatory potential will be applied between the electrodes 28 and 30. In response thereto, the transducer 20 will expand and contract as shown in FIGURES 13 through 16 with each cycle of the applied potential.

The transducer 20 is self-damping because it contains equal volumes of tensional and compressional strain that rapidly cancel upon termination of the potential between the electrodes 28 and 30. This is contrary to the prior art wherein the entire body, being uniformly polarized, expands and contracts together and "rings" for a large number of complete cycles after the potential between the electrodes has terminated.

Figure 10:
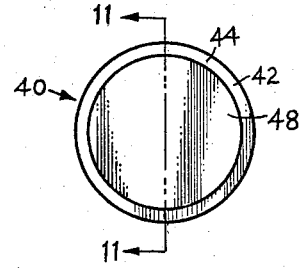
FIGURE 10 is a top view of an electroacoustic transducer according to the present invention.

In many applications, it may be desired that the transducer be a round disc as shown in FIGURES 10, 11 and 12. Transducer 40 comprises a piezoelectric body 42 and a pair of electrodes 48 and 50, placed on the parallel faces 44 and 46. Leads 52 and 54 are connected to electrodes 48 and 50 as shown. Concentric portions 56 and 58 of the piezoelectric body 42 are oppositely polarized as shown and comprise equal volumes according to the invention.

In order that the radial oscillations set up in the body 42 are rapidly damped out, it is desirable that the distance from the center 60 of the body 42 to the transition 62 between the portions 56 and 58 be an integral number of quarter wavelengths in terms of the radial transmission wavelength of the frequency of operation of the transducer 40. Similarly, it is desirable that the distance between the transition 62 and the outer periphery 64 of the portion 58 also be an integral number of quarter wavelengths so that the overall radial distance to the polarization periphery 64 is an integral number of half wavelengths as shown in FIGURE 12.

As will be obvious to those skilled in the art, the transducers 20 and 40 of the invention are normally mounted with only their central portions 36 and 56 radiating from the search unit. The peripheral portions 38 and 58 are normally shielded so that they do not radiate out of phase with the central portion. In this regard, it should be noted that the contracting portion of the transducer aids the expanding portion of the transducer since the piezoelectric bodies 22 and 42 are not perfectly elastic. Thus, more power may be radiated by the central portions 36 and 56 than would be expected with the uniform polarizations of the prior art.

It will also be understood by those skilled in the art that the edge portions 38 and 50 are normally in better acoustical coupling with the transducer assembly than the central portions 36 and 56. Thus, it is desirable to normally store slightly more energy in the edge portions 38 and 58 than the central portions 36 and 56 to make up for the energy loss to the transducer mounting.

Figure 1:
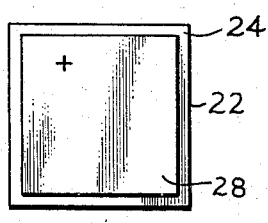
FIGURE 1 is a top view of an electroacoustic transducer according to the present invention during its process of manufacture.
Figure 3:
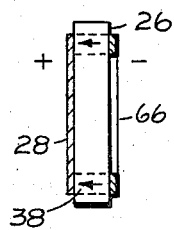
FIGURE 3 is a cross-sectional view taken along the line 3—3 of FIGURE 2.
Figure 2:
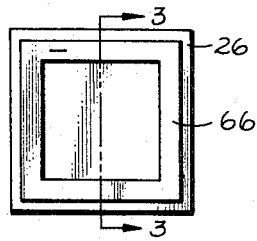
FIGURE 2 is a bottom view of the transducer of FIGURE 1.

A transducer according to the invention may be easily manufactured as illustrated in FIGURES 1 through 6. As shown therein, the piezoelectric body 22 initially has the electrode 28 applied to its front face 24 in the conventional manner. However, on its back face 26 only an annular electrode 66 is deposited of substantially the same shape as the cross section of the volume desired to be polarized. A potential is then applied between the electrodes 28 and 66, as shown in FIGURE 3, to polarize the edge portion 38 as shown by the arrows. Thereafter, the electrode 66 is removed from the body 22.

Figure 4:
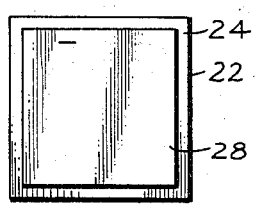
FIGURE 4 is a top view of the electroacoustic transducer of FIGURE 1 during its process of manufacture.
Figure 6:
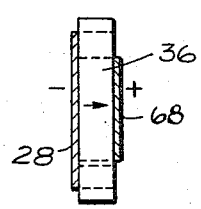
FIGURE 6 is a cross-sectional view taken along the line 6—6 of FIGURE 5.
Figure 5:
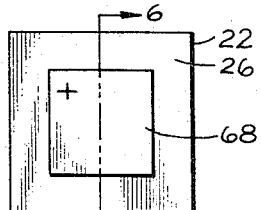
FIGURE 5 is a bottom view of the transducer of FIGURE 4.

Now refer to FIGURES 4, 5 and 6. A central electrode 68 of the same size and shape as the desired central portion 36 is plated on the back face 26 of the body 22. A potential is applied between electrode 28 and 68 of opposite polarity to that applied as shown in FIGURE 3 to polarize the central portion 36 of the body 22 in the opposite sense as shown by the arrows. Thereafter, a large electrode 30 is plated on the back face 26 of the body 22 in the usual manner to produce the transducer 20 shown in FIGURES 7, 8 and 9.

Many variations of the invention are possible. The transducers may take any shape. For some applications, they may not be resonant between their electrodes. There may be more than two body portions polarized in different ways. The only requirement of the invention is that equal acoustically coupled volumes of the transducer be polarized such that strains of opposite kind induced therein, for example, tensional and compressional strains, store equal energy so that the strains will tend to cancel and self-damp the transducer.

It will thus be seen that the objects set forth above, among those made apparent from the preceding description, are efficiently attained and, since certain changes may be made in the above articles without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. An electroacoustic transducer comprising:
    (A) a piezoelectric body having a first and a second major surface;
    (B) A first and a second electrode adjacent to each major surface, and,
    (C) at least two volumetric portions of said body between said electrodes being polarized such that upon the application of an electric field thereto, a first and a second potential energy quantity is stored in said portions of opposite kind and upon termination of said electric field the potential energy is changed to a first and a second kind of kinetic energy that is substantially mutually cancellable, thus creating a self-damping transducer.

2. An electroacoustic transducer as defined in claim 1 wherein:
    (C) said portions comprise at least two portions storing substantially equal amounts of energy when an electric field is applied thereto.

3. An electroacoustic transducer as defined in claim 1 wherein:
    (C) said portions are concentric.

4. An electroacoustic transducer as defined in claim 3 wherein:
    (D) said portions comprise two portions of opposite polarization.

5. An electroacoustic transducer as defined in claim 4 wherein:
    (E) said portions are of substantially equal volume.

6. An electroacoustic transducer as defined in claim 3 wherein:
    (D) said portions are circularly symmetric and each have a radical thickness equal to an integral number of quarter wavelengths at the operating frequency of the transducer.

7. An electroacoustic transducer as defined in claim 6 wherein:
    (E) said portions comprise a pair of portions of substantially equal volume having opposite polarizations.

References Cited

UNITED STATES PATENTS

| Re. 23,813 | 4/1954 | Adler | 310—8.5 |
| 2,515,446 | 7/1950 | Gravley | 310—8.5 |
| 2,967,957 | 1/1961 | Massa | 310—9.7 |
| 3,004,176 | 10/1961 | Mason | 310—8.6 |
| 3,115,588 | 12/1963 | Hueter | 310—8.6 |
| 3,343,105 | 9/1967 | Derpauw | 310—9.7 |

MILTON O. HIRSHFIELD, *Primary Examiner.*

J. D. MILLER, *Examiner.*